Patented Feb. 8, 1927.

1,616,994

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

VULCANIZATION OF RUBBER AND METHOD OF PRODUCING SAME.

No Drawing. Application filed November 8, 1924. Serial No. 748,766.

My invention relates to the vulcanization, or curing, of rubber and rubber compounds; and it has, for its primary object, the provision of accelerators, which are very effective as aids to vulcanization. More particularly, it is related to the use of accelerators which are essentially cyclic bases, embodying carbon and nitrogen in their ring structures, and the derivatives formed therefrom.

Piperazine is such a cyclic base, and though in this form it possesses some undesirable qualities when used as an accelerator, it is so superior in its capacity to vulcanize a rubber product and gives aging qualities so much better than many accelerators now in common use, that its undesirable features can be overlooked, or evaded without unjustifiable expense. When it comes in contact with the air, the anhydrous form not only absorbs moisture but also carbon dioxide; on the other hand, the hexahydrate is reasonably stable. It melts at 44° C. and boils at 125°, giving up its water of crystallization to form the anhydrous base (M. P. 104° C.—B. P. 145° C.). Besides the reaction with carbon dioxide, piperazine reacts with acids, phenols, aldehydes, aldols, carbon bisulfide, diazo solutions and sodium hypochlorite to form materials many of which possess accelerating properties.

As above stated, this base is not stable toward atmospheric conditions, however, it forms many derivatives, which in some instances have lost some of their capacity as accelerators, nevertheless, they are more easily handled. Examples of these derivatives are the reaction products formed when piperazine (diethylene diimine) react with carbon bisulfide, diazo-benzene-chloride, aldehydes, aldols, fatty acids or the weaker inorganic acids such as boric and others.

In a product whose ratio of ingredients is: 100 parts rubber, 5 parts activator (ZnO,) 6 parts sulfur, 1 part accelerator, I have found that piperazine gives a cure in less than ten minutes while its carbon bisulfide derivative requires an hour.

In a mixture having the following ratio of ingredients: 100 parts rubber, 35 parts gas black, 20 parts activator (ZnO), 5 parts sulfur, 6 parts piperazine and stearic acid, a good cure was obtained in an hour. In each of the examples given, steam at 40 pounds pressure was used as the source of heat. While my invention may be practiced without the use of an activator, I prefer to employ one because it materially adds to the quality of the product and shortens the time required to cure the stock. Such materials as the oxides and many of the salts of zinc or lead generally serve in this capacity.

In the above examples, I have specifically used piperazine (diethylene diimine) whose formula is:

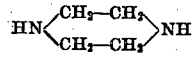

It is understood, however, that similar organic bases could be used, such for example as dimethylene diimine, dipropylene diimine, or higher homologues or combinations thereof, such for example as ethylene propylene diimine, having the following formula:

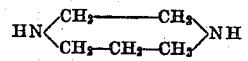

It is apparent therefore that these materials have the following general formula:

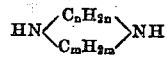

where $n$ and $m$ may or may not be equal.

As many apparently widely different embodiments of this invention may be made without departing from the spirit thereof, it is understood that the invention should not be limited to the specific examples herein set forth, nor should it be limited or made dependent upon the soundness of any theory presented by way of explanation. Furthermore, although I have specifically described accelerators that may be utilized in promoting the vulcanization of rubber, it is obvious that minor changes may be made in the application of the principles of my invention without departing from the scope thereof, and I desire, therefore, that only such limi-

What I claim is:

1. A method of accelerating the vulcanization of rubber that consists in vulcanizing the same in the presence of a material having the general structure $$HN\langle {}^{C_nH_{2n}}_{C_mH_{2m}}\rangle NH$$

or a derivative thereof.

2. A method of vulcanizing caoutchouc that comprises admixing caoutchouc with a vulcanizing agent and an activator, incorporating in such mixture a derivative of a cyclic base embodying two atoms of nitrogen in its saturated ring structure and applying heat thereto.

3. A method of vulcanizing caoutchouc that comprises admixing caoutchouc with a vulcanizing agent and an activator, incorporating in such mixture diethylene-diimine and applying heat thereto.

4. A method of vulcanizing caoutchouc that comprises admixing caoutchouc with a vulcanizing agent and an activator, incorporating in such mixture a derivative of diethylene diimine and applying heat thereto.

5. A method of vulcanizing caoutchouc that comprises admixing caoutchouc with a vulcanizing agent and an activator, incorporating therein a salt of diethylene-diimine and applying heat thereto.

6. A method of vulcanizing caoutchouc that comprises admixing caoutchouc with a vulcanizing agent and an activator, incorporating therein diethylene-diimine stearate and applying heat thereto.

7. An article of manufacture obtained by vulcanizing a rubber mixture in the presence of an organic base having the general formula:

$$HN\langle {}^{C_nH_{2n}}_{C_mH_{2m}}\rangle NH$$

or any of its derivatives.

8. A vulcanized product formed by the reaction of caoutchouc, a vulcanizing agent, an activator and a strong cyclic base embodying two atoms of nitrogen in its saturated ring structure or derivatives thereof.

9. A vulcanized product formed by the reaction of caoutchouc, a vulcanizing agent, an activator and a salt of a cyclic base embodying two atoms of nitrogen in its carbon ring structure.

10. A vulcanized product formed by the reaction of caoutchouc, a vulcanizing agent, and activator and diethylene-diimine.

11. A vulcanized product formed by the reaction of caoutchouc, a vulcanizing agent, an activator and a salt of diethylene-diimine.

12. A vulcanized product formed by the reaction of caoutchouc, a vulcanizing agent, an activator and diethylene-diimine stearate.

13. A vulcanized product formed by the reaction of caoutchouc, a vulcanizing agent, an activator and a derivative of diethylene-diimine.

In witness whereof, I have hereunto signed my name.

LORIN B. SEBRELL